No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 1.
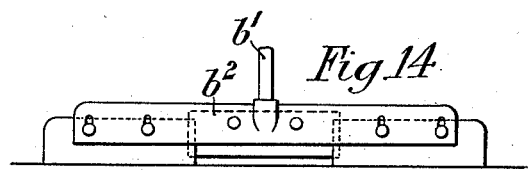
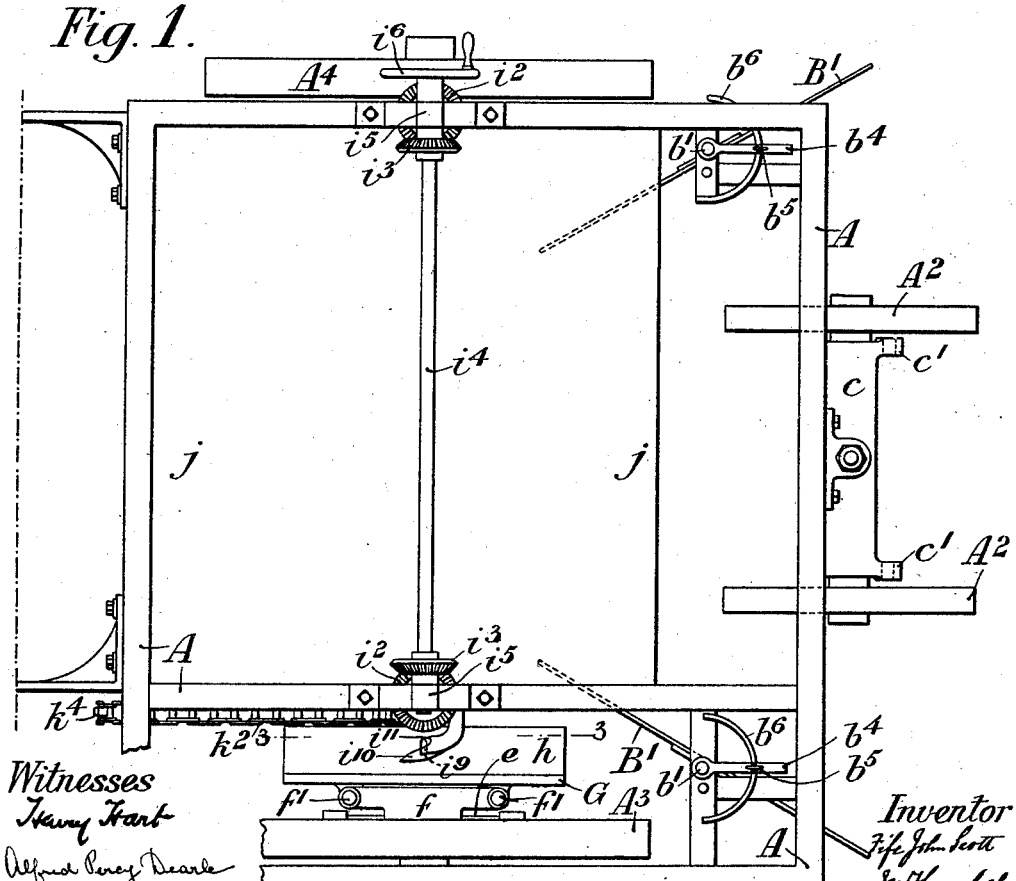

No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 2.
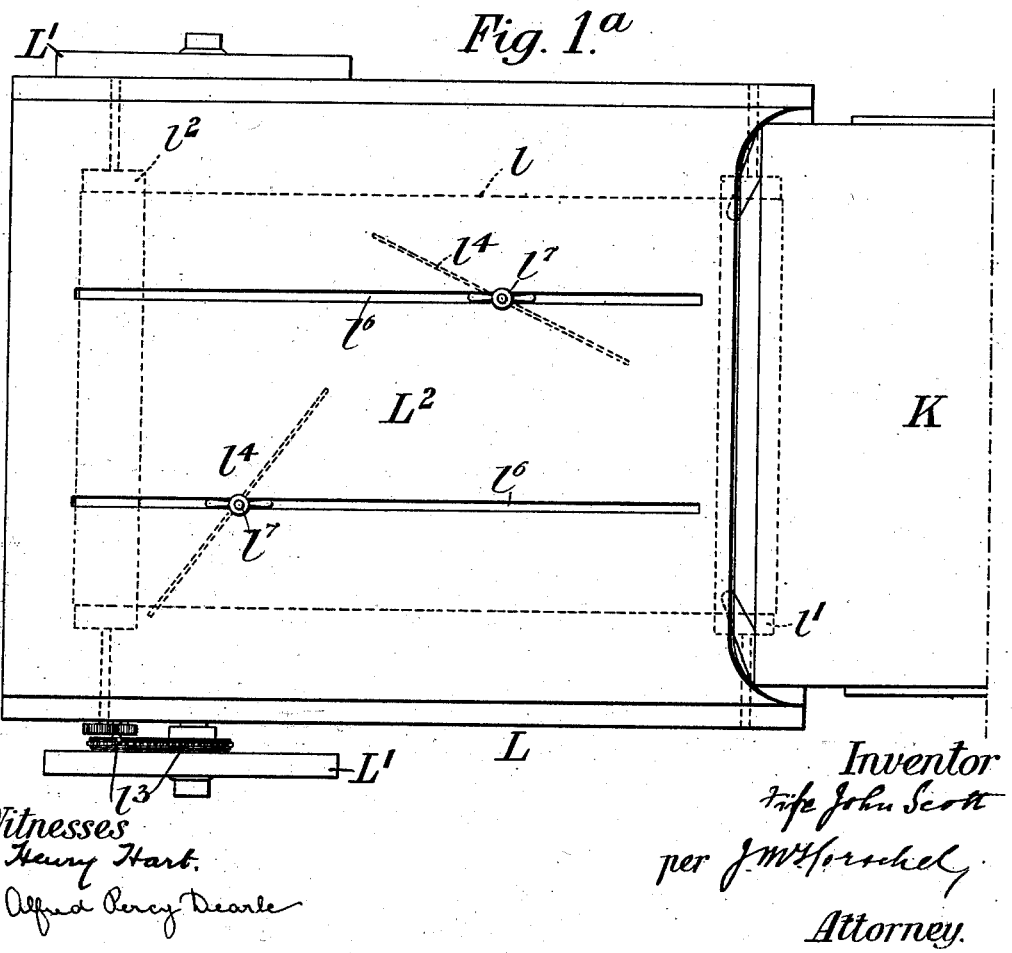

No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 3.
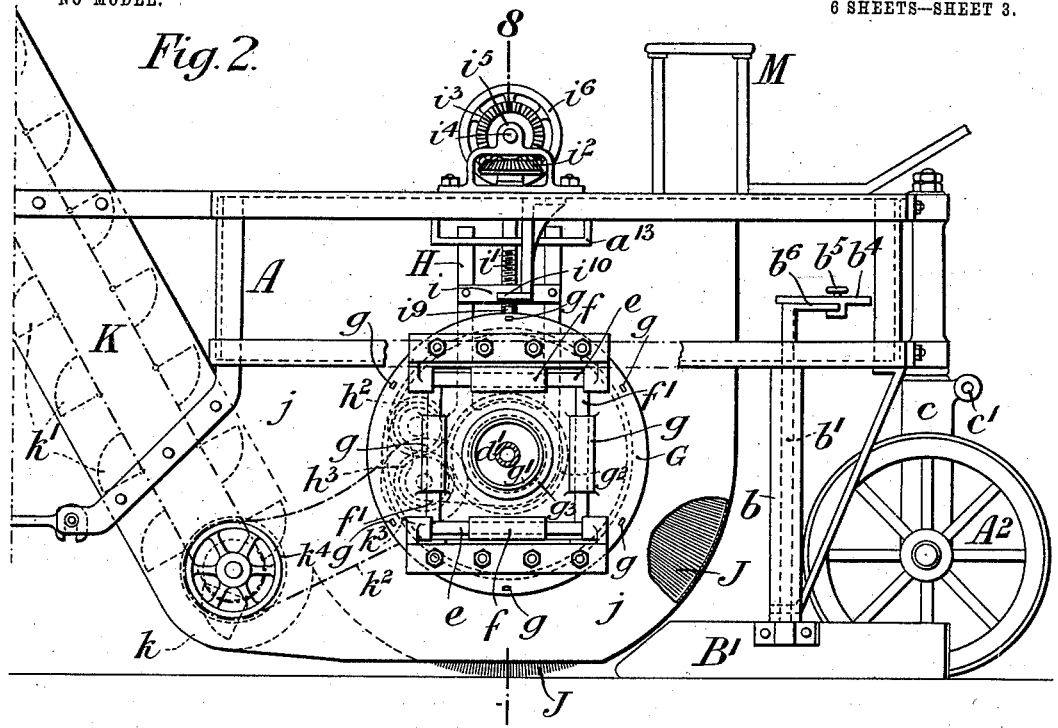
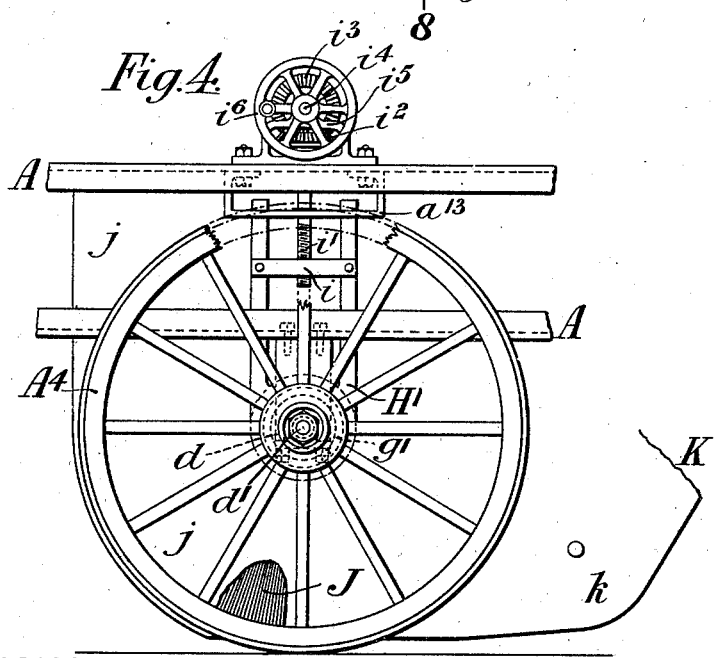

No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 4.
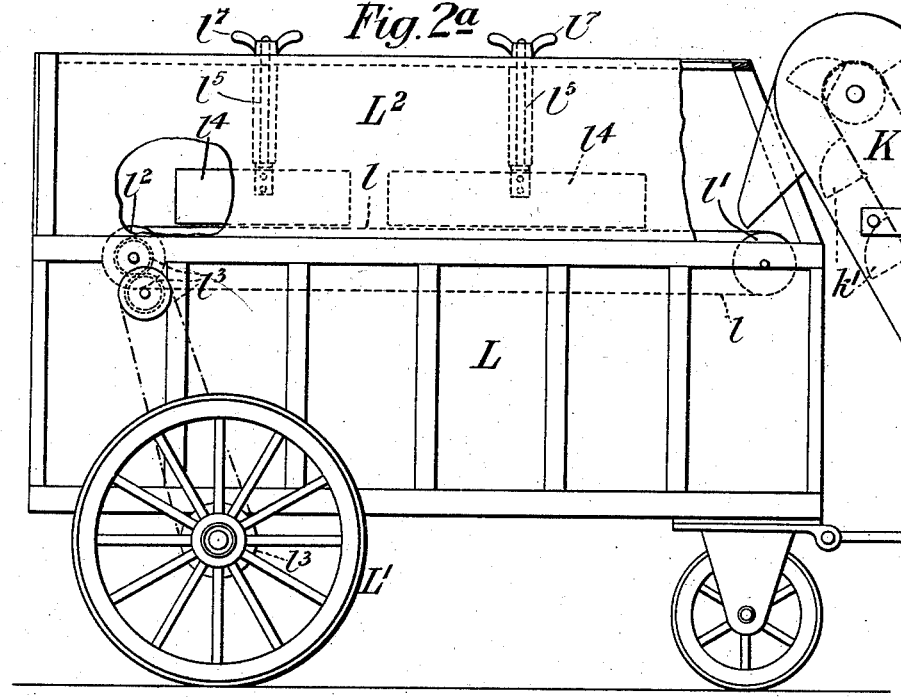
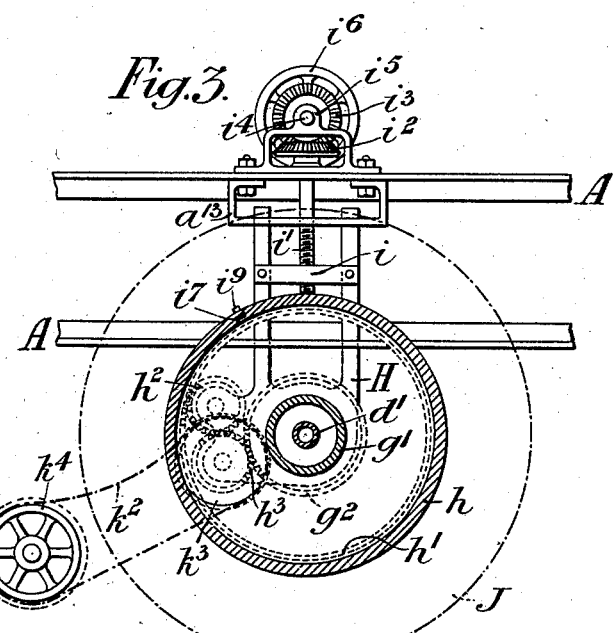
Witnesses
Henry Hart
Alfred Percy Dearle
Inventor
Fife John Scott
per J. W. Horschel
Attorney.

No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 5.

Witnesses
Henry Hart.
Alfred Percy Dearle

Inventor
Fife John Scott
per J. W. Horschell
Attorney.

No. 748,109. PATENTED DEC. 29, 1903.
F. J. SCOTT.
STREET CLEANSING OR SCAVENGERING APPARATUS.
APPLICATION FILED NOV. 11, 1901.
NO MODEL. 6 SHEETS—SHEET 6.
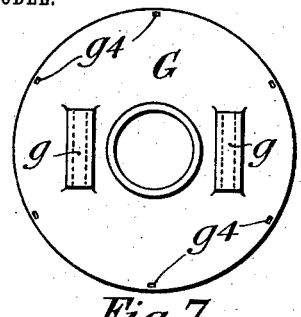
Fig. 7.
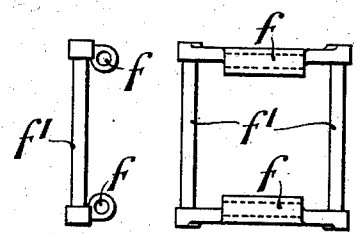
Fig. 10. Fig. 9.
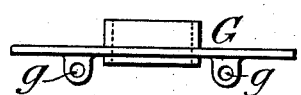
Fig. 8.
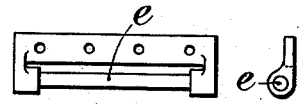
Fig. 11. Fig. 12.
Fig. 13.
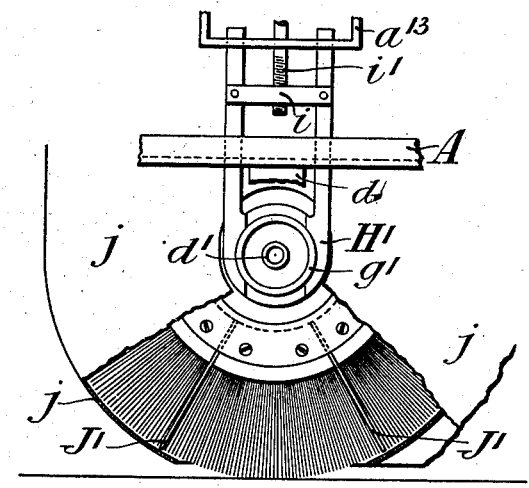
Fig. 15.
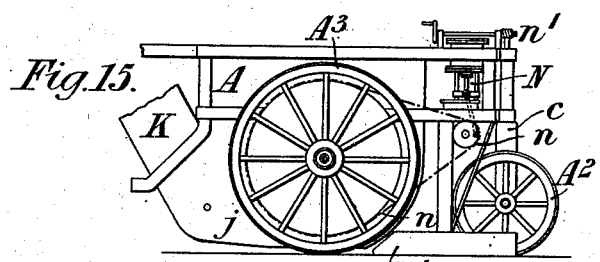
Witnesses.
Henry Hart.
Alfred S. Dearle
Inventor
F. J. Scott.
per
J. M. Horschell.
Attorney.

No. 748,109. Patented December 29, 1903.

UNITED STATES PATENT OFFICE.

FIFE JOHN SCOTT, OF SOUTH CROYDON, ENGLAND.

STREET CLEANSING OR SCAVENGERING APPARATUS.

SPECIFICATION forming part of Letters Patent No. 748,109, dated December 29, 1903.

Application filed November 11, 1901. Serial No. 81,890. (No model.)

*To all whom it may concern:*

Be it known that I, FIFE JOHN SCOTT, merchant, a subject of the King of England, residing at 3 Croham road, South Croydon, in the county of Surrey, England, have invented certain new and useful Improvements in Street Cleansing or Scavengering Apparatus, (for which I have applied for patent in Great Britain, No. 12,498, dated June 19, 1901,) of which the following is a specification.

This invention has for its object to provide an apparatus or machine which shall effect the cleansing of public streets and other places with great economy and expedition; and the invention will be best understood by reference to the accompanying drawings, in which—

Figure 5:
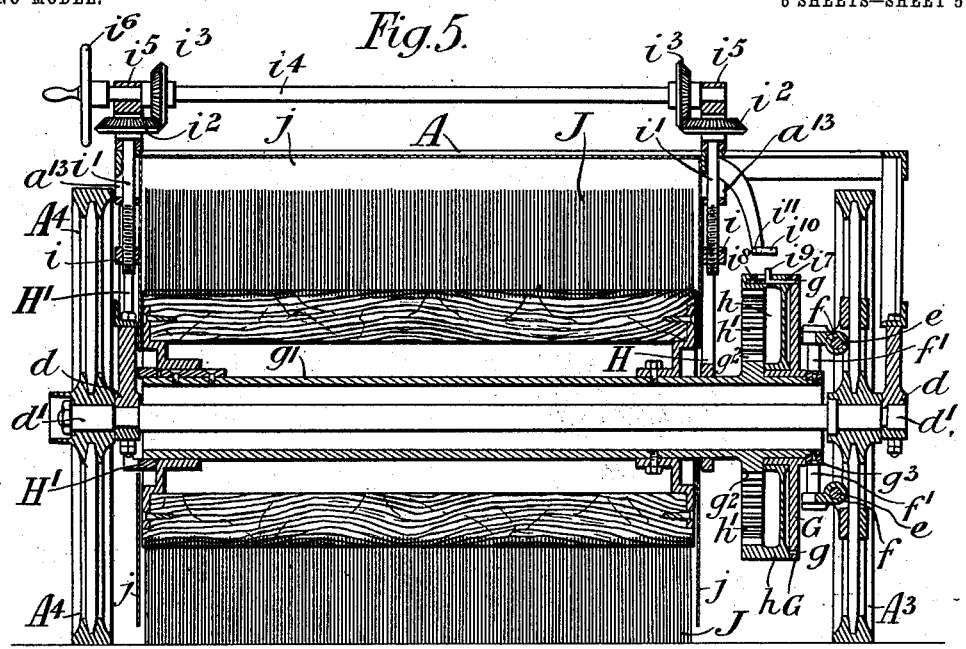
Figure 6:
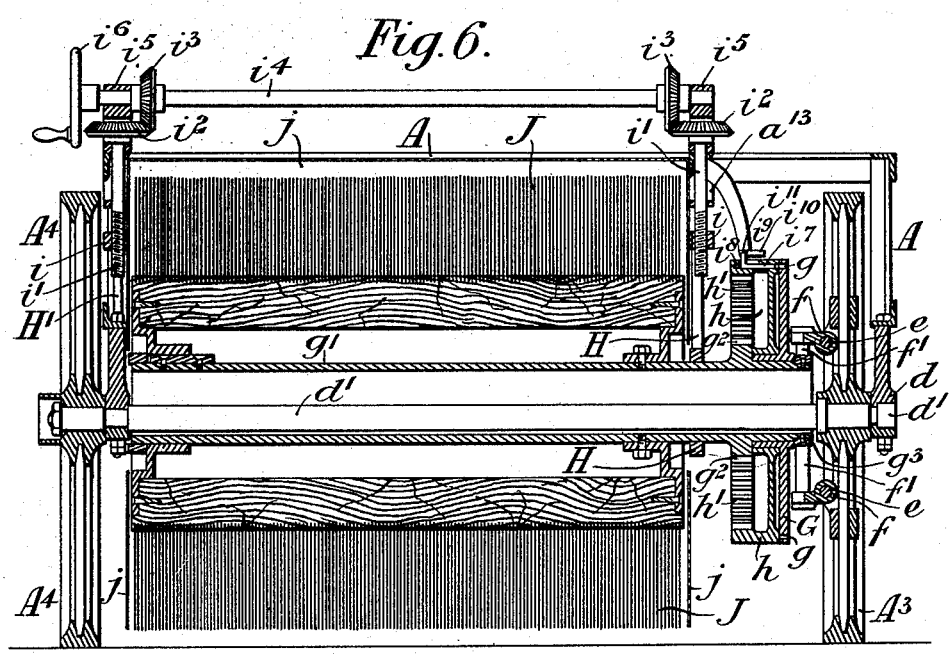

Figure 1 is the right-hand part, and Fig. 1$^a$ the corresponding left-hand part, of a plan of the machine. Fig. 2 is the right-hand part, and Fig. 2$^a$ the corresponding left-hand part, of a side elevation of the machine as seen from the bottom of Figs. 1 and 1$^a$, but with certain parts omitted. Fig. 3 is a sectional side elevation of part of the machine on the line 3 3 of Fig. 1 viewed from the bottom of that figure. Fig. 4 is an elevation of the left-hand side of part of the machine. Fig. 5 is a transverse vertical section on the line 8 8 of Fig. 2 looking toward the front of the machine. Fig. 6 is a view similar to Fig. 5, showing the machine in its inoperative condition. Figs. 7 and 8 are respectively an elevation and a plan of the disk. Figs. 9 and 10 are elevations, taken at right angles to each other, of the rigid sliding frame; and Figs. 11 and 12 are elevations, taken at right angles to each other, of one of the two parallel guide-bars, all these parts constituting detached portions of a coupling embodied in my improved machine. Fig. 13 is a sectional side elevation, Fig. 14 a side elevation, and Fig. 15 a diagrammatic side elevation, showing modifications.

The same letters of reference are used to indicate like or corresponding parts throughout the several figures of the drawings.

In carrying out the invention in the manner represented the frame A is supported at the sides by two wheels $A^3$ $A^4$ and at the front by two steering-wheels $A^2$ $A^2$, which latter are mounted in a vertically-pivoted under carriage or yoke $c$, provided with eyes or lugs $c'$ $c'$, by means of which draft-animals or a steam or other road locomotive or the like may be attached to it. The bearings $d$ $d$, in which the axle $d'$ of the wheels $A^3$ $A^4$ is mounted, are, as shown in Figs. 5 and 6, situated one at the outside of the wheel $A^3$ and the other at the inside of the wheel $A^4$, and both of these wheels are free to rotate upon the said axle. To the wheel $A^3$ are secured two parallel guide-bars $e$ $e$, one of which is shown detached in Figs. 11 and 12 in front and end elevations, respectively, along which are free to slide guides $f$ $f$, rigidly secured to two other guide-bars $f'$ $f'$, which are situated in planes perpendicular to those containing the guide-bars $e$ $e$. The guides $f$ $f$ and guide-bars $f'$ $f'$, as shown in front and side elevation, respectively, in Figs. 9 and 10, constitute a rigid frame which is capable of moving relatively to the wheel $A^3$ only in a direction parallel with the guide-bars $e$ $e$. G is a disk having two rigid guides $g$ $g$, (see particularly the face and edge views represented in Figs. 7 and 8, respectively,) capable of only a sliding motion along the guide-bars $f'$ $f'$, this motion being at right angles to the motion of the above-named frame $f f f'$ $f'$ on the guide-bars $e$ $e$. By this arrangement it will be seen that it is possible for the disk G and road-wheel $A^3$ to be adjusted in parallel planes, so as to be brought either concentric with each other or moved into different eccentric relationships without disturbing their rotative connections. The disk G is rotatably mounted on one end of a hollow shaft $g'$, which, as shown in Figs. 5 and 6, extends across the machine, with the road-wheel axle $d'$ passing longitudinally through it. This hollow shaft $g'$ has secured upon or formed in part with it a spur-wheel $g^2$, which, in conjunction with a collar $g^3$, prevents any axial motion of the disk G on the said shaft, while leaving it free to rotate thereon. Adjacent to disk G and rotatably mounted on the boss thereof is a wheel or drum $h$, having teeth $h'$ in the same plane as the toothed wheel $g^2$. The toothed wheels $g^2$ $h'$ are geared together by intermediate gear-wheels $h^2$ $h^3$, the short shafts or studs of which are mounted in a bracket-bearing H. This bracket H and another one, H', (see particularly Fig. 13,) at the opposite side of the machine (the two brackets H H' being similar, excepting that H' has no gear-wheels thereon) are formed with or constitute bearings or yokes wholly or partially encircling the hollow shaft $g'$, and they are arranged so that they may be raised and lowered in guides $a^{13}$, provided in or on the machine-frame A. Near the upper ends of the brackets H H' are secured screw-threaded nuts $i$, which engage with the correspondingly-threaded lower ends of two vertical shafts $i'$, on whose upper ends are secured miter-wheels $i^2$, geared together by other miter-wheels $i^3$ and a transverse shaft $i^4$, the latter of which is mounted in bearings $i^5$ and at one end provided with a hand-wheel $i^6$. By rotating the hand-wheel $i^6$ in one direction the brackets H H' are raised, and with them the hollow shaft $g'$, gearing $h'$ $h^2$ $h^3$, and disk G, the hollow shaft $g'$ thus being rendered eccentric in relation to the road-wheel axle $d'$, although the disk G still retains its rotative connection with the road-wheel $A^3$. The wheel or drum $h$ is provided with a spring-pressed sliding bolt $i^7$, one end of which is adapted to engage with one of a series of holes or notches $g$ in the disk G, the spring $i^8$ tending always to effect such engagement. The bolt $i^7$ is provided with an outwardly-projecting end $i^9$, which during the normal working of the machine performs no special function, but which when the wheel or drum $h$ is raised, as before explained, is adapted to come into contact with a stationary cam or horn $i^{10}$, as indicated in Fig. 6, whereby it is retracted (in opposition to the spring $i^8$) and its end is disengaged from the disk G, which thereafter continues to rotate independently of the wheel or drum $h$. The cam or horn $i^{10}$ is provided with a shoulder or abutment $i^{11}$, Fig. 1, against which after the bolt $i^7$ has been retracted, as last described, the bolt end $i^9$ will rest to prevent the further rotation of the wheel or drum $h$ and its directly-connected parts, this state of inoperation being maintained until by rotating the hand-wheel $i^6$ in the required direction the bolt end $i^9$ is lowered out of engagement with the cam or horn $i^{10}$, at which juncture the spring $i^8$ acts on the bolt $i^7$ to force it into engagement with the hole or notch $g$ next presented to it. On the hollow shaft $g'$ is suitably secured a cylindrical brush or refuse-detacher J of any desired construction. This brush is of substantially the same external diameter as the road-wheels $A^3$ $A^4$ or preferably slightly larger, so that when it is coaxial with the said road-wheels its periphery will bear with the necessary pressure on the surface of the road. The brush or detacher J is almost entirely inclosed in a suitable housing $j$ to as much as possible prevent the distribution or dissemination of the dust or particles removed from the road-surface, and at its back this housing is in open communication with a receptacle or pocket $k$, constituting the lower end of an elevator or conveyer K, by which the refuse deposited in said pocket by the brush J is conveyed into a wagon L, coupled to the rear of the brush-machine. The connected series of elevator-buckets $k'$ is operated by a chain $k^2$ and sprocket-wheels $k^3$ $k^4$, of which latter the wheel $k^3$ is in rigid connection with the before-described spur-wheel $h^3$. The chain $k^2$ is sufficiently slack to admit of the raising and lowering of the sprocket-wheel $k^3$ independently of the wheel $k^4$.

The wagon L is of any desired construction. It is, however, advantageously provided with means whereby the refuse discharged by the elevator K is satisfactorily distributed throughout the said wagon. For this purpose, as shown in Figs. 1$^a$ and 2$^a$, the elevator discharges the refuse onto an endless apron $l$, adapted to travel over two rollers $l'$ $l^2$, the shafts of which are journaled in the sides of the wagon. To one of these rollers—say, for example, the roller $l^2$—rotary motion is transmitted by spur-and-sprocket gearing $l^3$ from one of the road-wheels L' L'. Depending from the hood or top $L^2$ of the wagon are two or more deflectors $l^4$ $l^4$, whose lower edges are close to the upper surface of the apron $l$ and the vertical stems $l^5$ $l^5$ of which pass through slots $l^6$ $l^6$ in the hood $L^2$, and at the outside of the latter the said stems are provided with clamping-nuts $l^7$ $l^7$. By these means the deflectors $l^4$ $l^4$ may be adjusted to and secured in any desired position or at any required angle. By these deflectors the refuse moved along with the upper reach of the apron $l$ is deflected sidewise and caused to fall over the edges of the said apron, and when the refuse becomes heaped up at the different parts of the wagon the deflectors $l^4$ $l^4$ are moved into other positions, so that the refuse may be delivered at other parts.

In advance of the brush or detacher J there are provided two scrapers B' B', the stems $b'$ $b'$ of which are supported in sockets $b$ $b$ and have fixed on their upper ends lever-arms $b^4$, adapted to be moved over and secured by clamping-screws $b^5$ $b^5$ to quadrants $b^6$ $b^6$. By these means the scrapers B' B' may be adjusted to any desired angle or they may be rendered practically inoperative by being adjusted so as to be parallel with the direction of the travel of the machine.

The scrapers B' B' are each formed partly of india-rubber and partly of wood or metal and either in one piece, as represented in Figs. 1 and 2, or, as illustrated in Fig. 14, a plurality of pieces. When the scrapers are formed of a plurality of pieces, said pieces are connected to each other or to a common stock $b^2$, Fig. 14, in such manner as to enable them to yield independently of each other in passing over protuberances or obstacles on or into depressions in the road, or these pieces are arranged in advance of and overlapping each other. As an example the central section of the scraper (shown in Fig. 14) is represented in a raised position, such as it might assume when passing over a protuberance on the road-surface.

When the rotary brush-machine is at work, the brush or detacher J thereof is in its lower position and through the gearing $h'$ $h^2$ $h^3$ and $g^2$ is rotated in the required direction at the necessary speed and removes the refuse from the road-surface and delivers it to the elevator K, which, as before explained, delivers it into the wagon L. When the machine is to be rendered inoperative—as, for example, when it is being returned from work—the brush or detacher J is elevated, so that it may be out of contact with the road-surface and at the same time be rendered non-rotative by the retraction of the spring-pressed bolt $i^7$, as hereinbefore described.

In Fig. 2 I have indicated a seat M for the driver or operator; but this may or may not be provided, according to requirements.

If desired, scrapers J', as shown in Fig. 13, are interspersed among the fibers of the rotary brush or detacher J or alternate with brush-segments thereon, the term "detacher" being herein employed to include all of such possible variations.

Instead of the rotary-brush machine being propelled in the manner before described a steam or other motor N is, as shown in Fig. 15, secured upon the frame A and operatively connected with one of the road-wheels $A^3$ $A^4$.

In Fig. 15 the motor N is shown connected to the road-wheel $A^3$ by chain-gearing $n$, and the steering-wheels $A^2$ $A^2$ are controlled by screw-gear $n'$.

I wish it to be understood that the foregoing arrangements are merely given as convenient examples of means for carrying the invention into practice and that, if desired, other means may be employed without departing from the spirit of the said invention.

What I claim as my invention, and desire to secure by Letters Patent, is—

1. In a street cleansing or scavengering machine the combination with a rigid frame and road-wheels supporting the frame, a scraper on the frame comprising a stock with a plurality of blades movable thereon substantially as set forth.

2. In a street cleansing or scavengering machine the combination with a rigid frame, and road-wheels supporting the frame, of a rotating brush for detaching the refuse from the road-surface, a hollow shaft for the brush, an axle for the road-wheels passing through the hollow shaft, and rotative gear in operative connection with the brush and one of the road-wheels substantially as set forth.

3. In a street cleansing or scavengering machine the combination with a rigid frame, and road-wheels supporting the frame, of a rotating brush for detaching the refuse from the road-surface, a shaft for the brush, guides on one of the road-wheels, slides movable along these guides in a plane perpendicular to the axis of the brush, guides on these slides in planes perpendicular to the planes in which are situated the guides on the road-wheel and slides loose on the last-named guides in operative connection with the shaft of the brush substantially as set forth.

4. In a road cleansing or scavengering machine the combination with a rigid frame and road-wheels supporting the frame, of a rotating brush for detaching the refuse from the road-surface, a shaft for the brush, guides on one of the road-wheels, slides movable along these guides in a plane perpendicular to the axis of the brush, guides on these slides in planes perpendicular to the planes in which are situated the guides on the road-wheel, slides loose on the last-named guides, a disk in rigid connection with the last-named slides, a spur-wheel in operative connection with the rotating brush and a locking device securing the spur-wheel and disk in rotative connection substantially as set forth.

5. In a road cleansing or scavengering machine the combination with a rigid frame and road-wheels supporting the frame, of a rotating brush for detaching the refuse from the road-surface, a shaft for the brush, guides on one of the road-wheels, slides movable along these guides in a plane perpendicular to the axis of the brush, guides on these slides in planes perpendicular to the planes in which are situated the guides on the road-wheel, slides on the last-named guides, a disk in rigid connection with the last-named slides, adjusting devices for raising and lowering the brush, a spur-wheel in operative connection with the rotating brush, a spring-pressed bolt locking the spur-wheel and disk in rotative connection, a projection on the bolt, and a cam on the frame engaging said projection for releasing the spur-wheel from the disk substantially as set forth.

6. In a road cleansing or scavengering machine the combination with a rigid frame and road-wheels supporting the frame, of a rotating brush for detaching the refuse from the road-surface, a hollow shaft for the brush, an axle for the road-wheels passing through the hollow shaft, adjustable bearings supporting the hollow shaft, guides for said bearings, screw-shaft engaging these bearings and hand-gear in rotative connection with the screw-shaft for raising and lowering the said bearings substantially as set forth.

7. In a road cleansing or scavengering machine the combination with a rigid frame and road-wheels supporting the frame, of a rotating brush for detaching the refuse from the road-surface, a hollow shaft for the brush, an axle for the road-wheels passing through the hollow shaft, adjustable bearings supporting the hollow shaft, guides for said bearings, means for raising and lowering the said bearings, a spur-wheel in permanent operative connection with the rotating brush, a disk in permanent operative connection with one of the road-wheels, a spring-pressed bolt locking the spur-wheel and disk in rotative connection, a cam on the frame engaging the bolt for releasing the spur-wheel from the disk substantially as set forth.

8. In a road cleansing or scavengering machine the combination with a rigid frame and road-wheels supporting the frame, of a rotating brush for detaching the refuse from the road-surface, a shaft for the brush, adjustable bearings for the brush-shaft, a spur-wheel rigid on the said shaft, a second spur-wheel revoluble on the shaft, two intermeshing spur-wheels carried by one of the bearings and gearing each with one of the spur-wheels, a housing for the brush opening into a receptacle, a conveyer working in said receptacle, chain-and-sprocket gear for the conveyer, in operative connection with one of the intermeshing spur-wheels, a disk in operative connection with one of the road-wheels, a locking device operatively connecting the shaft of the brush with the disk, a cam on the frame for releasing the locking device, substantially as set forth.

In testimony whereof I have hereto set my hand in the presence of two subscribing witnesses.

FIFE JOHN SCOTT.

Witnesses:
 HENRY HART,
 GEO. J. B. FRANKLIN.